United States Patent
Sjoblom

(12) 
(10) Patent No.: US 6,595,923 B2
(45) Date of Patent: Jul. 22, 2003

(54) ULTRASONIC DOPPLER FLOW PHANTOM

(75) Inventor: David M. Sjoblom, Lake Stevens, WA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/992,658

(22) Filed: Nov. 14, 2001

(65) Prior Publication Data

US 2003/0092986 A1 May 15, 2003

(51) Int. Cl.[7] .................................................. A61B 8/00
(52) U.S. Cl. ........................ 600/437; 600/454; 600/456; 600/465; 73/1.86; 73/1.83
(58) Field of Search .................... 600/437; 73/599–646, 73/1.83, 1.86, 866.4, 866.21, 866.25

(56) References Cited

U.S. PATENT DOCUMENTS

| | | | |
|---|---|---|---|
| 4,277,367 A | | 7/1981 | Madsen et al. |
| 4,974,461 A | * | 12/1990 | Smith et al. ............... 73/865.6 |
| 5,052,934 A | * | 10/1991 | Carey et al. ................ 600/437 |
| 5,230,339 A | * | 7/1993 | Charlebois .................. 600/437 |
| 5,341,808 A | * | 8/1994 | Rickey et al. .............. 600/437 |
| 5,560,242 A | * | 10/1996 | Flax ............................ 73/1.82 |
| 5,632,623 A | * | 5/1997 | Kolff et al. ................. 434/272 |
| 5,656,763 A | * | 8/1997 | Flax ............................ 73/1.82 |
| 5,756,875 A | * | 5/1998 | Parker et al. ................ 73/1.86 |
| 5,886,245 A | * | 3/1999 | Flax ............................ 73/1.86 |
| 6,190,915 B1 | * | 2/2001 | Madsen et al. ................. 436/8 |
| 6,205,871 B1 | * | 3/2001 | Saloner et al. ............. 73/866.4 |
| 6,238,343 B1 | | 5/2001 | Madsen et al. |

OTHER PUBLICATIONS

Ramnarine, et al., "Doppler Backscatter Properties of a Blood–Mimicking Fluid for Doppler Performance Assessment," Ultrasound in Med. & Bio., vol. 25, No. 1, pp. 105–110, 1999.
Model 50 Specifications Sheet, publ. date unknown, 1 page.
Doppler Phantom/Flow Control System, User's Manual, Gammex, publ. date unknown, pp 1=9.

* cited by examiner

Primary Examiner—Marvin M. Lateef
Assistant Examiner—William C Jung
(74) Attorney, Agent, or Firm—W. Brinton Yorks, Jr.

(57) ABSTRACT

An ultrasonic Doppler flow phantom is described which is formed of tissue-mimicking material containing a plurality of fluid flow paths through which fluid is pumped. The fluid flow paths are made of tubing and each extends over a different portion of the depth of the phantom and at a different angle. Each path is individually accessible by a probe located on the simulated skin surface at the top of the phantom, enabling the performance of the probe to be evaluated over a wide range of depths from shallow to very deep and over several flow angles.

19 Claims, 4 Drawing Sheets

ULTRASONIC DOPPLER FLOW PHANTOM

This invention relates to test equipment for ultrasonic diagnostic imaging systems and, in particular, to Doppler flow phantoms for measuring and testing colorflow and Doppler sensitivity.

Phantoms are devices which are in widespread use to evaluate and calibrate to performance of ultrasound systems. A phantom is a box-like device containing tissue-mimicking material. Tissue-mimicking materials are substances which have an acoustic response which is closely matched to that of the human body. Generally such a material is strongly water based such as a gelatinous material, into which is mixed particles or other materials which simulate the acoustic scattering effect of the body. Phantoms usually contain objects of know size and dimensions at various depths in the phantom. These objects, such as small balls, fluid-filled balloons and pockets of fluids, provide specular an other characteristic targets which are sharply imaged when the ultrasound system is properly focused, or simulate pathology such as cysts and tumors that test the ability of the ultrasound system to detect or visualize such targets.

A particular type of phantom which is used to test and evaluate Doppler ultrasound capabilities is the flow phantom. A flow phantom generally consists of tissue-mimicking material with tubing passing therethrough. A liquid is pumped through the tubing to simulate a vessel with blood flowing through it. A Doppler probe is pressed into contact with the top surface of the tissue-mimicking material which simulates the skin surface, and an effort is made to image the flowing liquid or measure its velocity. In this way the flow phantom enables the Doppler capabilities of an ultrasound system to be evaluated and measured.

When Doppler ultrasound first came into use it was predominately used to measure flow in shallow (superficial) vessels such as the carotid artery, as the capability was ineffective or unreliable at deeper depths in the body. But as Doppler ultrasound system performance and sensitivity have improved over the years it has become possible to perform Doppler imaging and make Doppler measurements at ever-increasing depths in the body. Consequently there is now a need for phantoms to provide the ability to test the performance of Doppler imaging and measurement at greater depths. But a phantom simulating a greater depth must necessarily be larger and bulkier than previous phantoms. This is undesirable, as phantoms should be highly portable so they can be easily transported to the sites of different ultrasound systems where they are used. There exists a need for an ultrasound phantom to be compact, yet still enable the evaluation of ultrasound system performance at substantial imaging and measurement depths.

In accordance with the principles of the present invention, a flow phantom is provided having multiple fluid paths, each of which is designed to provide Doppler performance evaluation at a different range of depths or angle of incidence. The combination of the multiple paths provides the ability to measure Doppler sensitivity and performance over a significant range of depths without requiring a significantly larger phantom than those currently in use.

In the drawings

Figure 1:
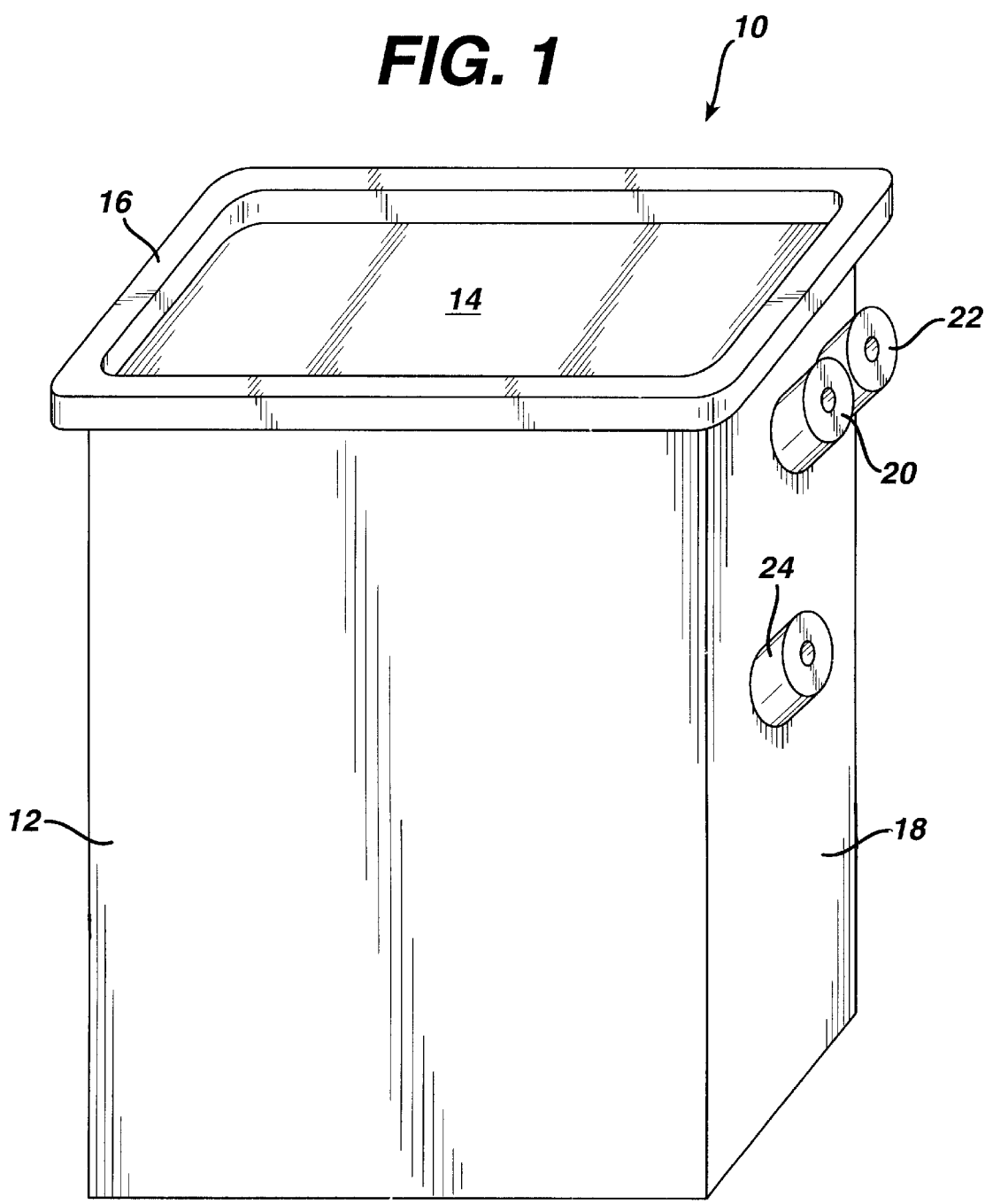
FIG. 1 is a perspective view of an ultrasonic phantom constructed in accordance with the principles of the present invention.

Referring first to FIG. 1, a Doppler phantom 10 constructed in accordance with the principles of the present invention is shown in a perspective view. The phantom 10 comprises a case 12 which is filled a tissue-mimicking material through which fluid paths extend. The case may be made of a tough, resilient material such as ABS plastic. The outer case may be lined with an inner box which contains the tissue-mimicking material and can be removed from the outer case. Such an inner box may be made of Plexiglas, for example. A preferred tissue-mimicking material is Zerdine™, a solid elastic water-based polymer which is manufactured by CIRS, Inc. [?] of [City, State]. Zerdine has an acoustic attenuation of 0.5 dB/cm/MHz, and a speed of sound of 1540 m/sec.

The case and box 12 are open at the top and covered with a rubber-like diaphragm 14 such as polyurethane or saran which simulates the skin surface and seals the top of the case, preventing the tissue-mimicking material from desiccating by exposure to the atmosphere. Molded around the upper edge of the case is a lip 16, which confines water and coupling gels used with the probe to the top of the phantom. An embodiment of the present invention may have an integrated water dam as illustrated by the lip 16, may have a removable water dam, or no water dam, as desired.

Molded on one side 18 of the case are three ports 20, 22, and 24 which provide access to fluid paths inside the phantom. Three other ports, not visible in this view, are located on the opposite side of the case. The phantom contains three fluid paths each of which extends from a port on one side of the case to a port on the other side of the case. The fluid paths are provided by acoustically transparent tubing such as C-flex tubing. In a constructed embodiment a barbed hose fitting is located inside each port and the tubing is connected between hose fittings on opposite sides of the phantom.

Figure 2:
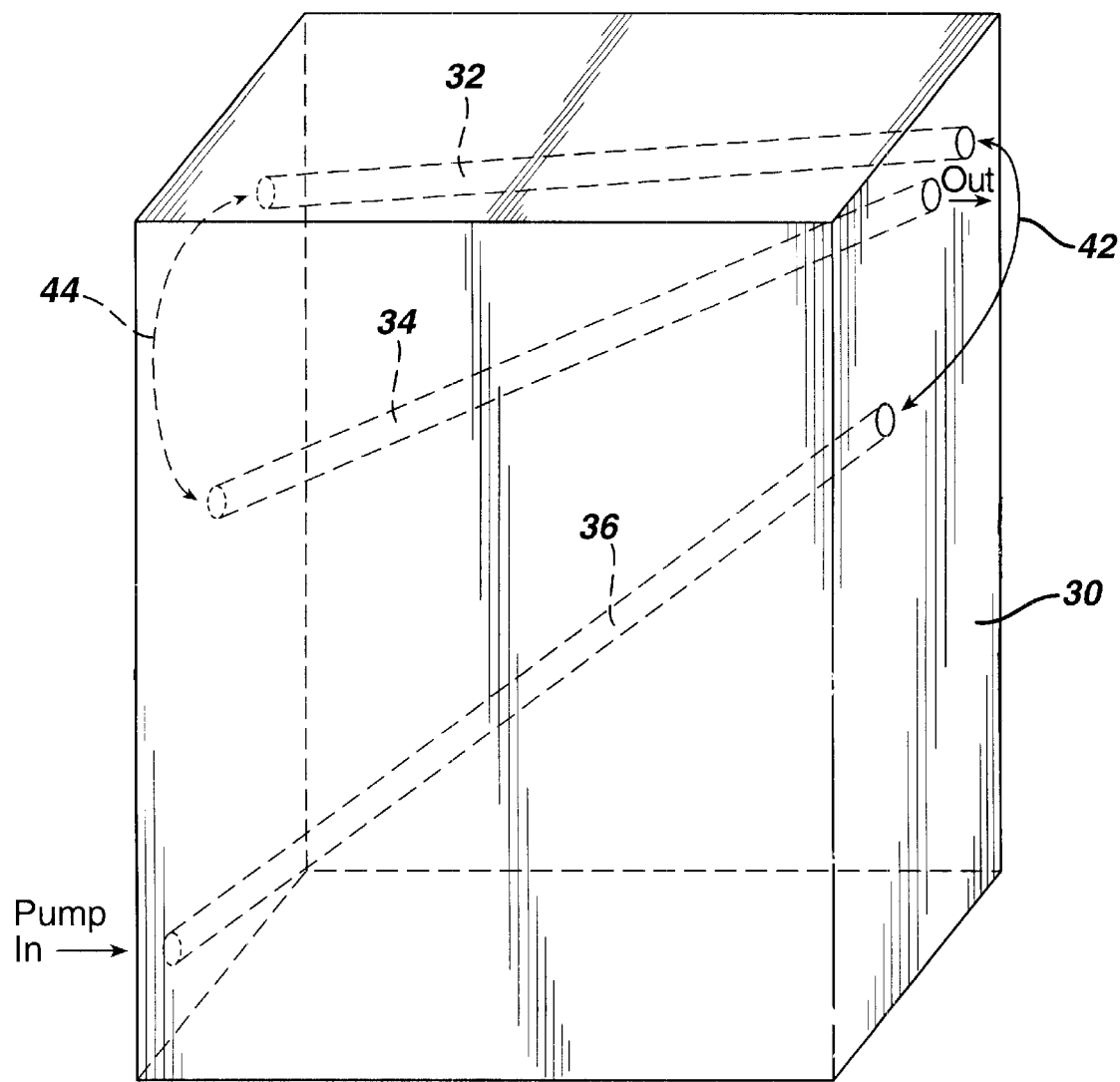
FIG. 2 illustrates the fluid paths in the phantom of FIG. 1.

FIG. 2 illustrates the tissue-mimicking material 30 with the case and top diaphragm removed. In this view the fluid paths 32, 34, 36 are visible. Each fluid path is seen to be sloped at a different angle to enable evaluation of Doppler detection of fluid flow at different angles of incidence. Furthermore, each fluid path traverses a different range of depth between its two ports on the sides of the phantom. One of the fluid paths, such as the shallowest fluid path 32, could be in a horizontal plane if desired to simulate a superficial vessel just beneath the skin surface. Each fluid path can be operated independently by connecting a source of fluid such as a pump and tubing to one port, with a fluid return connected to the other port at the opposite end of the fluid path. The fluid paths can be interconnected as indicated by arrows 44 so that one fluid source can flow through two or three fluid paths at the same time. When external tubing is connected to the ports 20, 22, 24, etc. as indicated by arrows 42, 44, fluid is pumped into fluid path 36, then into fluid path 32, then through fluid path 34 from which it exits and returns to the fluid reservoir of the pump. A suitable fluid which simulates the properties of blood is described in the paper "Doppler Backscatter Properties of a Blood-mimicking Fluid for Doppler Performance Assessment" by K. V. Ramnarine, et al., published in *Ult. in Med. & Biol.*, vol. 25, no. 1, pp. 105–110 (1999).

Figure 3:
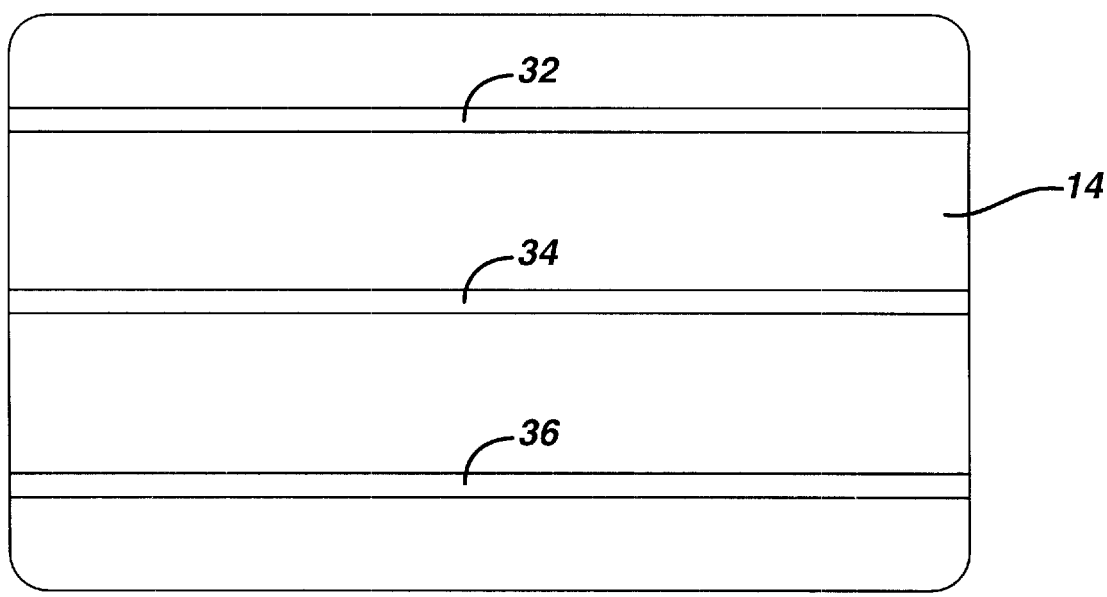
FIG. 3 is a top view of the phantom of FIG. 1 illustrating the lateral separation of the fluid paths.

FIG. 3 is a top view of the simulated skin surface of the phantom which shows that each fluid path 32, 34, 36 is in a different vertical plane in the phantom. This enables a probe to have unimpeded access to any of the three fluid paths by placing the probe in contact with the simulated skin surface diaphragm 14 above the desired fluid path. If desired, other targets such as monofilament wires and balls could be located between the fluid paths to provide testing for non-Doppler probes with the same phantom.

Figure 4:
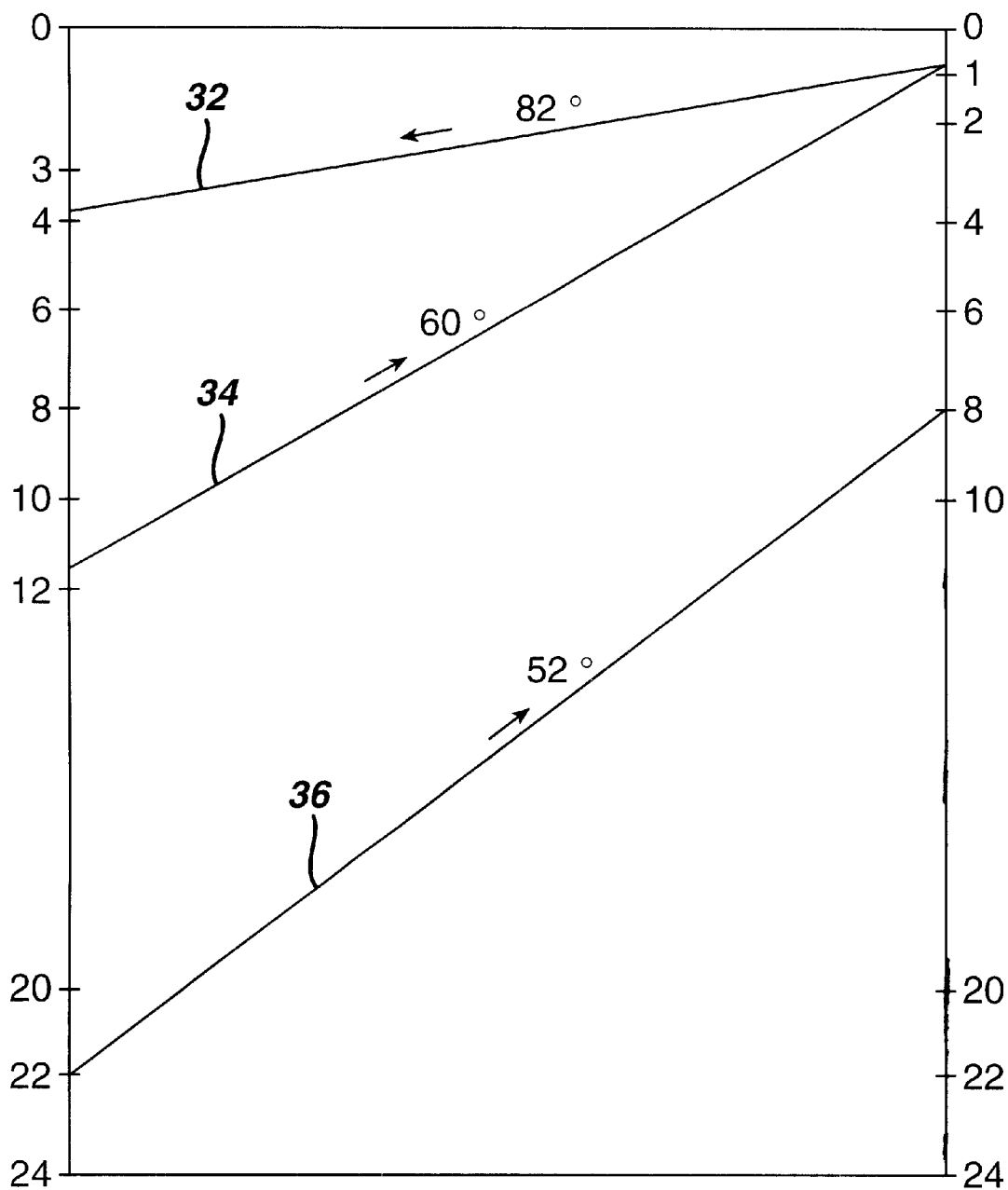
FIG. 4 illustrates the range of depths covered by the fluid paths of FIG. 2.

FIG. 4 is a side view showing the precise location and angulation of the fluid paths in the phantom. The arrows above the fluid paths indicate the direction of fluid flow when a pump and external tubing are connected as shown in FIG. 2. As this drawing shows, the illustrated phantom enables testing of flow measurement at depths ranging from one to 22 centimeters. The phantom is 24 cm high from the diaphragm 14 to the bottom of the tissue-mimicking material. The shallowest fluid path 32 is sloped at an angle of 82° relative to vertical and extends from its shallowest depth of 1 cm to its maximum depth of almost 4 cm as it traverses the width of the phantom. The next fluid path 34 extends from 1 cm to almost 12 cm and is sloped at an angle of 60°, which is a common reference angle for Doppler ultrasound. The deepest fluid path 36 extends from 8 cm to 22 cm and is sloped at an angle of 52°. Thus, the depth ranges of the three fluid paths extend completely from one cm to 22 cm with only a small overlap between adjoining ranges. The depth ranges can also be contiguous, non-contiguous, or fully overlapping, depending upon the objectives of the phantom designer. Preferably the ranges of depths covered by the inclined fluid paths extend over 80%, and most preferably 90%, of the full depth of the phantom. The use of multiple fluid paths at different depths enables the phantom to be much narrower and more compact than it would be if a single fluid path were sloped from 1 to 22 cm at the same angles of inclination. The multiple fluid paths extending over several depth ranges and together extending over a significant range of depths enables the phantom to be used to test high frequency probes designed for shallow depth imaging, which would use fluid path 32, as well as low frequency probes designed for deeper depth imaging, which would use one of the deeper fluid paths such as path 36.

What is claimed is:

1. An acoustic flow phantom which simulates flow conditions inside tissue comprising:

an enclosure;

tissue-mimicking material located in the enclosure;

a surface which is accessible to an acoustic transducer; and a plurality of fluid paths simulating flow vessels, each extending across a substantial portion of the acoustic field of view from the surface, and traversing different depth ranges from the surface of the phantom as they extend through the tissue-mimicking material.

2. The acoustic flow phantom of claim 1, wherein the surface is the top surface of the tissue-mimicking material, and comprises a diaphragm which seals the tissue-mimicking material in the enclosure.

3. The acoustic flow phantom of claim 1, wherein the enclosure further comprises a plurality of ports located on different sides of the phantom which provide access to the fluid paths.

4. The acoustic flow phantom of claim 1, wherein the fluid paths comprise a first fluid path extending through the tissue-mimicking material from a first depth to a second depth, and a second fluid path extending through the tissue-mimicking material from a third depth to a fourth depth, wherein the first depth is less than the fourth depth and wherein the third depth is less than or equal to the second depth.

5. The acoustic flow phantom of claim 4, wherein the first and second fluid paths extend in substantially straight lines.

6. The acoustic flow phantom of claim 5, wherein the first and second fluid paths comprise tubing which is substantially acoustically transparent.

7. The acoustic flow phantom of claim 1, wherein the fluid paths are located in vertical planes passing through the tissue-mimicking material which are non-intersecting, whereby each fluid path may be acoustically interrogated individually by an acoustic transducer contacting the surface.

8. The acoustic flow phantom of claim 1, further comprising a fluid path which may be selectively used to interconnect the fluid paths which extend through the tissue-mimicking material, whereby fluid may be pumped successively through the fluid paths which extend through the tissue-mimicking material.

9. The acoustic flow phantom which simulates flow conditions inside tissue comprising:

an enclosure;

tissue-mimicking material located in the enclosure;

a surface which is accessible to an acoustic transducer; and a plurality of fluid paths traversing different depth ranges of the phantom as they extend through the tissue-mimicking material, wherein at least one of the fluid paths traverses a depth range at an angle of inclination relative to the surface which presents a Doppler angle which is not ninety degrees.

10. The acoustic flow phantom of claim 9, wherein at least two of the fluid paths traverse depth ranges at different angles of inclination relative to the surface which presents two different Doppler angles which are not ninety degrees.

11. An ultrasonic Doppler phantom comprising:

an enclosure;

tissue-mimicking material located in the enclosure and having a surface through which ultrasonic energy enters the material during use of the phantom, the material extending over a depth range from the surface to a maximum depth; and a plurality of fluid paths located in the tissue-mimicking material, each fluid path extending over a different sub-range of the depth range from a shallow depth to a deeper depth, the sub-ranges together comprising a majority of the depth range.

12. The ultrasonic Doppler phantom of claim 11, wherein the sub-ranges together comprise over eighty percent of the depth range.

13. The ultrasonic Doppler phantom of claim 11, wherein the sub-ranges together comprise over ninety percent of the depth range.

14. The ultrasonic Doppler phantom of claim 11, wherein the sub-ranges are not overlapping.

15. The ultrasonic Doppler phantom of claim 11, wherein the sub-ranges are overlapping.

16. The ultrasonic Doppler phantom of claim 11, wherein the sub-ranges are contiguous.

17. The ultrasonic Doppler phantom of claim 11, wherein each fluid path traverses its sub-range at a different angle of inclination relative to the surface.

18. The ultrasonic Doppler phantom of claim 17, wherein each fluid path extends in a substantially straight line.

19. The ultrasonic Doppler phantom of claim 17, wherein each fluid path is located in a vertical plane which does not intersect the vertical plane of another fluid path in the tissue-mimicking material.

* * * * *